(12) United States Patent
Uvarov et al.

(10) Patent No.: US 7,671,909 B2
(45) Date of Patent: Mar. 2, 2010

(54) METHOD AND APPARATUS FOR PROCESSING BAYER-PATTERN DIGITAL COLOR VIDEO SIGNAL

(75) Inventors: Timofei Uvarov, Suwon-si (KR); Hyung-Guen Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 909 days.

(21) Appl. No.: 11/411,471

(22) Filed: Apr. 26, 2006

(65) Prior Publication Data
US 2006/0284862 A1    Dec. 21, 2006

(30) Foreign Application Priority Data
Apr. 27, 2005  (KR) ............... 10-2005-0034913

(51) Int. Cl.
*H04N 9/64* (2006.01)
(52) U.S. Cl. .................................... 348/246
(58) Field of Classification Search ............ 348/241, 348/246, 247
See application file for complete search history.

(56) References Cited

U.S. PATENT DOCUMENTS

| | | | | |
|---|---|---|---|---|
| 5,327,246 A | * | 7/1994 | Suzuki ............... | 348/246 |
| 6,965,395 B1 | * | 11/2005 | Neter ............... | 348/129 |
| 7,009,644 B1 | * | 3/2006 | Sanchez et al. ....... | 348/247 |
| 2002/0196354 A1 | | 12/2002 | Chang et al. | |
| 2003/0133027 A1 | * | 7/2003 | Itoh ................ | 348/246 |
| 2004/0051798 A1 | * | 3/2004 | Kakarala et al. ...... | 348/246 |
| 2004/0169746 A1 | * | 9/2004 | Chen et al. ......... | 348/246 |
| 2005/0248671 A1 | * | 11/2005 | Schweng ............ | 348/246 |
| 2006/0012694 A1 | * | 1/2006 | Yoneda et al. ....... | 348/246 |
| 2008/0143856 A1 | * | 6/2008 | Pinto et al. ......... | 348/246 |

FOREIGN PATENT DOCUMENTS

| | | |
|---|---|---|
| JP | 11-220661 | 8/1999 |
| JP | 2000-287135 | 10/2000 |
| JP | 2003-116060 | 4/2003 |
| WO | 2005/011261 | 2/2005 |

OTHER PUBLICATIONS

Chinese First Office Action dated Feb. 27, 2009 in corresponding Chinese Appln. No. 200610089877.8.

* cited by examiner

*Primary Examiner*—Timothy J Henn
(74) *Attorney, Agent, or Firm*—F.Chau & Associates, LLC

(57) ABSTRACT

Provided are a method and apparatus for processing a Bayer pattern digital color video signal, where the video signal processing apparatus includes a BP detector that generates the pixel information signal PIS representing whether the current pixel is good or bad from the input video data based on the difference between the current pixel data and neighbor pixel data, and an interpolator that interpolates the bad pixel using neighbor pixel data in response to the pixel information signal.

24 Claims, 10 Drawing Sheets

FIG. 7A

| G (P00) | R (P01) | G (P02) | R (P03) | G (P04) |
|---|---|---|---|---|
| B (P10) | G (P11) | B (P12) | G (P13) | B (P14) |
| G (P20) | R (P21) | G (P22) | R (P23) | G (P24) |
| B (P30) | G (P31) | B (P32) | G (P33) | B (P34) |
| G (P40) | R (P41) | G (P42) | R (P43) | G (P44) |

FIG. 7B

| R (P00) | G (P01) | R (P02) | G (P03) | R (P04) |
|---|---|---|---|---|
| G (P10) | B (P11) | G (P12) | B (P13) | G (P14) |
| R (P20) | G (P21) | R (P22) | G (P23) | R (P24) |
| G (P30) | B (P31) | G (P32) | B (P33) | G (P34) |
| R (P40) | G (P41) | R (P42) | G (P43) | R (P44) |

FIG. 11A

| N00 (+) | N01 (+) | N02 (−) |
|---|---|---|
| N10 (+) | C | N12 (−) |
| N20 (−) | N21 (−) | N22 (−) |

FIG. 11B

| N00 (+) | N01 (−) | N02 (−) |
|---|---|---|
| N10 (+) | C | N12 (−) |
| N20 (+) | N21 (−) | N22 (−) |

FIG. 11C

| N00 (+) | N01 (+) | N02 (−) |
|---|---|---|
| N10 (−) | C | N12 (−) |
| N20 (−) | N21 (+) | N22 (−) |

METHOD AND APPARATUS FOR PROCESSING BAYER-PATTERN DIGITAL COLOR VIDEO SIGNAL

CROSS-REFERENCE TO RELATED APPLICATION

This application claims foreign priority under 35 U.S.C. § 119 to Korean Patent Application No. 10-2005-0034913, filed on Apr. 27, 2005, in the Korean Intellectual Property Office, which is herein incorporated by reference in its entirety.

BACKGROUND OF THE INVENTION

1. Field of the Invention

The present disclosure relates to digital video signal processing, and more particularly, to methods and apparatus for processing digital color video signals generated by solid-state image sensing devices.

2. Description of the Related Art

FIG. 1 is a block diagram of a conventional solid-state image sensing device 100. Referring to FIG. 1, the solid-state image sensing device 100 includes an active pixel sensor (APS) array 110, a row driver 120 and an analog-to-digital converter 130. In addition, the solid-state image sensing device 100 further includes a controller (not shown) generating timing control signals for controlling the row driver 110 and the analog-to-digital converter 130 and addressing signals for selecting pixels of the APS array 110 and outputting a video signal sensed by the APS array 110. In a color solid-state image sensing device, generally, a color filter is located on each pixel of the APS array 110 to receive only a specific color light, as shown in FIG. 2. Here, at least three kinds of color filters are arranged in order to construct color signals. The most general color filter array has Bayer pattern in which red and green color patterns are repeatedly arranged in one row and green and blue color patterns are repeatedly arranged in another row. In this case, green is closely related to a luminance signal and is arranged in all rows, and red and blue are alternately arranged in rows to improve luminance resolution. In cellular telephones, digital still cameras and the like, a CMOS image sensor/charge-coupled device (CIS/CCD) having more than a million pixels arranged as the APS array 110 is used.

In the solid-state image sensing device 110 having the Bayer pattern pixel structure, the APS array 110 senses light using photodiodes and converts the sensed light into electric signals to generate video signals. The video signals output from the APS array 110 include red, green and blue analog signals. The analog-to-digital converter 130 receives the analog video signals output from the APS array 110 and converts them into digital video signals.

FIG. 3 is a block diagram of a conventional video signal processing system 300. Referring to FIG. 3, the video signal processing system 300 includes a solid-state image sensing device 310, a video signal processor 320 and a display 330. A red-green-blue (RGB) digital video signal output from the solid-state image sensing device 310 is processed by the video signal processor 320 and then output to the display 330 such as a liquid crystal display (LCD). When an image is displayed based on pixel data generated by the solid-state image sensing device 310, the image has lots of distortion and poor visual quality. Thus, the video signal processor 320 interpolates the pixel data generated by the solid-state image sensing device 310 with a predetermined scheme and outputs the interpolated pixel data to the display 330 to enhance the visual quality.

However, distortion of the output signal of the Bayer APS array applied to a video signal processing system such as a cellular telephone and a digital still camera has not been sufficiently corrected. Distortion requiring correction includes aliasing at edges, color moiré, loss of detail/blurring occurrence, false/pseudo color occurrence, and the like. These distortion phenomena can be generated because high-frequency areas such as lines or edges are not appropriately interpolated during the process of replacing bad pixels with interpolated data. Particularly, the bad pixels may produce white or black spots.

SUMMARY OF THE INVENTION

The present disclosure provides a video signal processing method for processing Bayer-pattern digital color video signals with a new scheme to display images with high quality on a display.

The present disclosure also provides a video signal processing apparatus for detecting bad pixels from a Bayer-pattern digital color video signal and interpolating the detected bad pixels.

According to an aspect of the present disclosure, there is provided a video signal processing method including: receiving input video data; generating a pixel information signal that represents whether the current pixel is a good pixel or a bad pixel based on differences between the current pixel and neighbor pixels; and interpolating the bad pixel using neighbor pixel data in response to the pixel information signal.

The generating of the pixel information signal includes: comparing the minimal value of the absolute values of the differences with first and second thresholds to decide the pixel information signal; and deciding the pixel information signal based on a third threshold on which average variance in the neighborhood of the current pixel is reflected when the minimal value is between the first and second thresholds.

According to another aspect of the present disclosure, there is provided a video signal processing apparatus including a bad pixel (BP) detector and an interpolator. The BP detector generates a pixel information signal that represents whether the current pixel is a good pixel or a bad pixel from input video data based on differences between the current pixel and neighbor pixels. The interpolator interpolates the bad pixel using neighbor pixel data in response to the pixel information signal.

The BP detector includes a threshold checking unit, an average variance checking unit and a consistency checking unit. The threshold checking unit compares the minimal value of the absolute values of the differences with first and second thresholds to decide the pixel information signal. The average variance checking unit decides the pixel information signal based on a third threshold on which average variance in the neighborhood of the current pixel is reflected when the minimal value is between the first and second thresholds.

BRIEF DESCRIPTION OF THE DRAWINGS

The above and other features and advantages of the present disclosure will become more apparent by describing in detail exemplary embodiments thereof with reference to the attached drawings, in which:

FIG. 7A is a diagram for explaining a difference between the current pixel G and neighbor pixels;

FIG. 7B is a diagram for explaining a difference between the current pixel R and neighbor pixels;

FIG. 11A illustrates the case where good neighbors are located at the left, left-top and top of the current pixel;

FIG. 11B illustrates the case where good neighbors are located at the left, left-top and left-bottom of the current pixel;

FIG. 11C illustrates the case where good neighbors are located at the top, left-top and bottom of the current pixel.

DETAILED DESCRIPTION OF PREFERRED EMBODIMENTS

Figure 1:
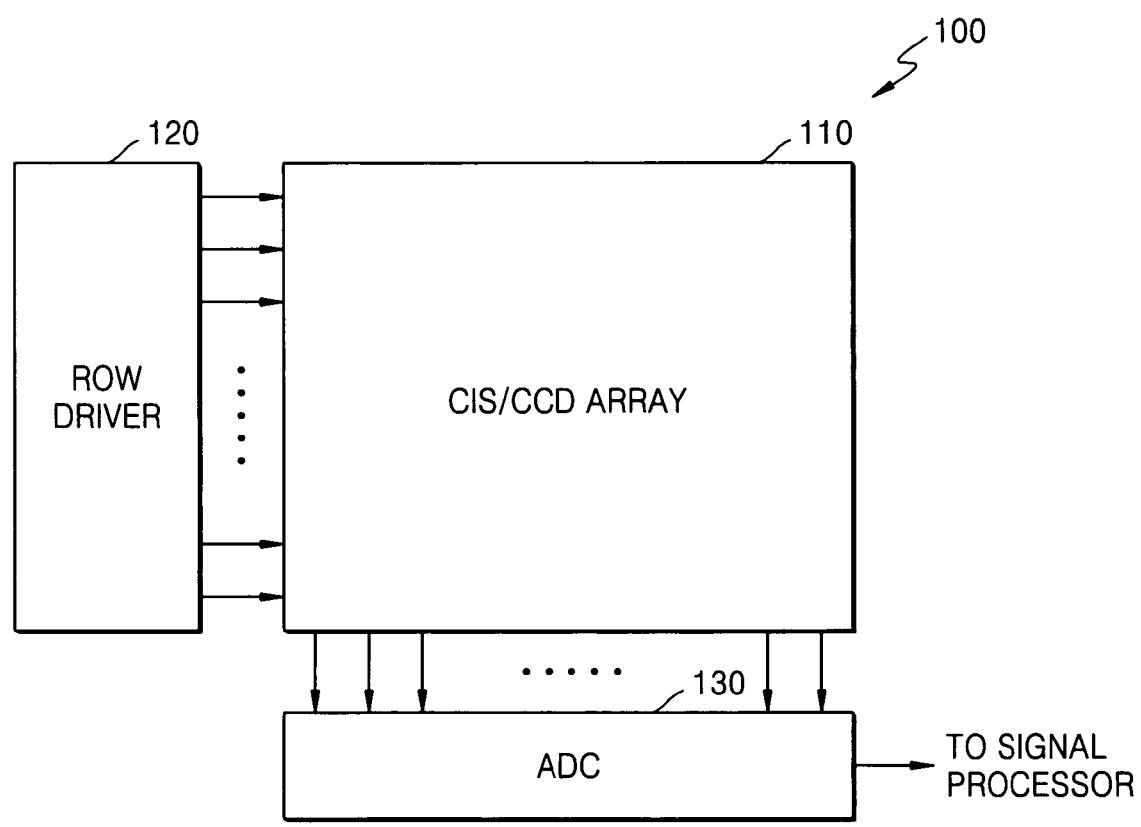
FIG. 1 is a block diagram of a conventional solid-state image sensing device.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concepts of the invention to those of ordinary skill in the pertinent art. Throughout the drawings, like reference numerals refer to like elements.

Figure 4:
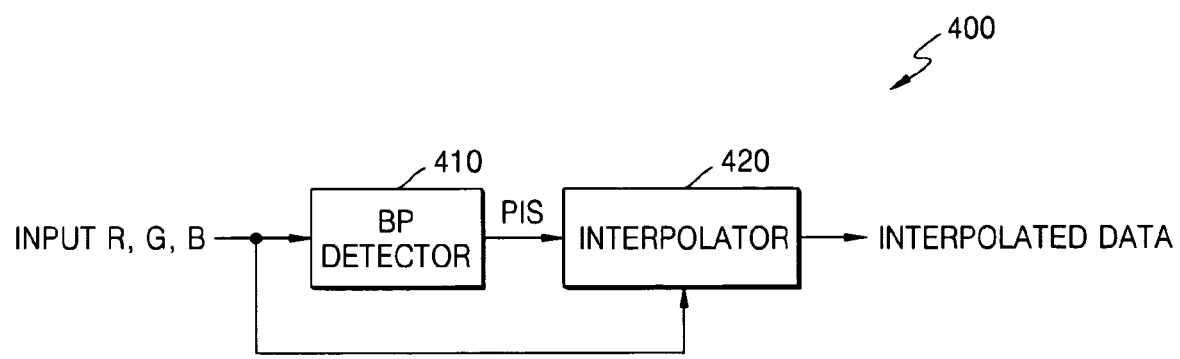
FIG. 4 is a block diagram of a video signal processing apparatus according to an embodiment of the present disclosure.

FIG. 4 is a block diagram of a video signal processing apparatus 400 according to an embodiment of the present disclosure. Referring to FIG. 4, the video signal processing apparatus 400 includes a bad pixel (BP) detector 410 and an interpolator 420.

The video signal processing apparatus 400 can be applied to a video signal processing system such as a cellular telephone and a digital still camera. The video signal processing apparatus 400 processes RGB digital video data output from a solid-state image sensing device employing a CMOS image sensor/charge-coupled device (CIS/CCD) to compensate signal distortion, to thereby display images with high quality.

The BP detector 410 generates a pixel information signal PIS representing whether the current pixel is a good pixel or a bad pixel from the input video data based on differences between current pixel data and neighbor pixel data items. The input video data can be RGB digital data of a Bayer pattern output from the solid-state image sensing device. The interpolator 420 carries out interpolation at bad pixels using the neighbor pixel data in response to the pixel information signal PIS.

Figure 5:
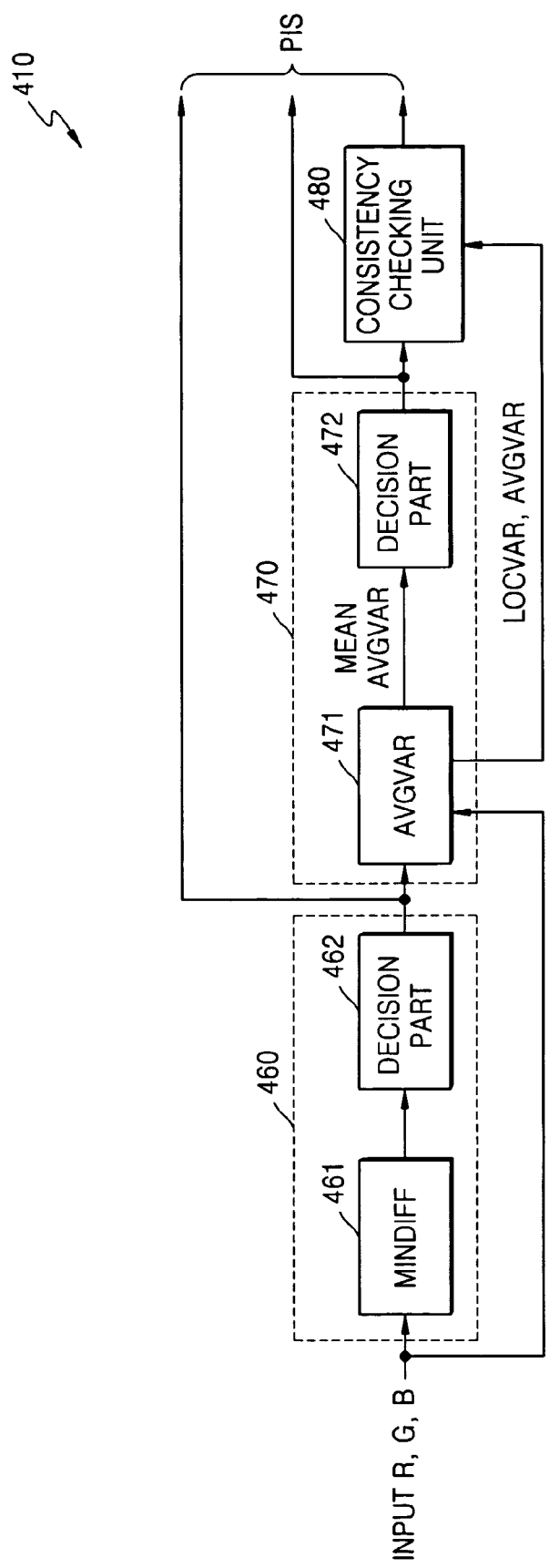
FIG. 5 is a block diagram of the bad pixel (BP) detector of FIG. 4.

FIG. 5 is a block diagram of the BP detector of FIG. 4. Referring to FIG. 5, the BP detector 410 includes a threshold checking unit 460, an average variance checking unit 470, and a consistency checking unit 480. The operation of the BP detector 410 is explained with reference to FIG. 6.

Figure 2:
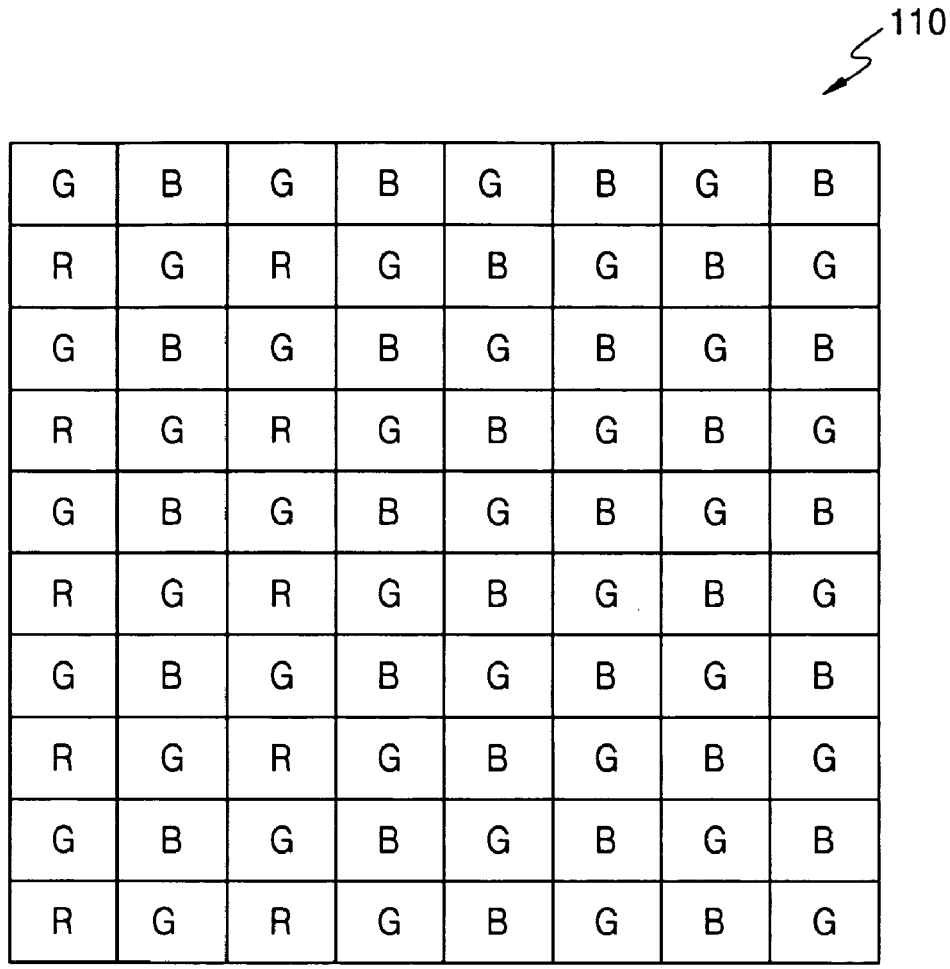
FIG. 2 illustrates a Bayer pattern pixel array.
Figure 3:
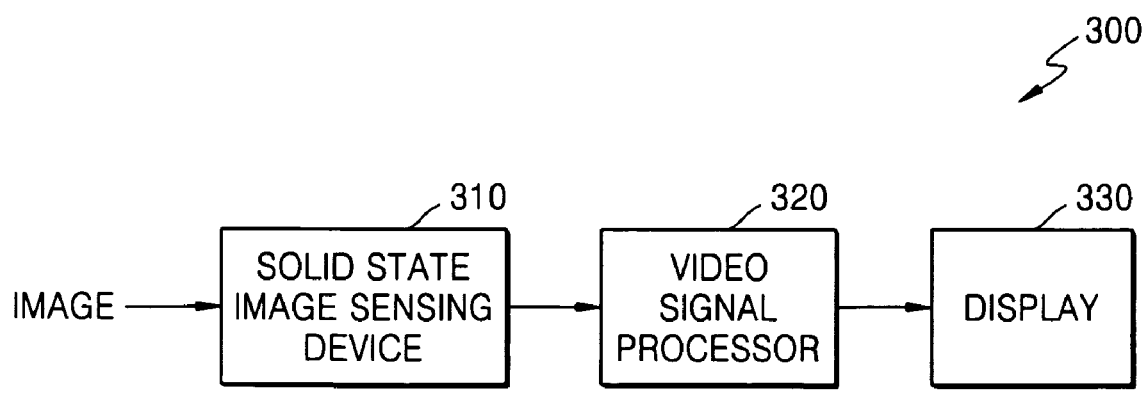
FIG. 3 is a block diagram of a conventional video signal processing system.

The threshold checking unit 460 includes a minimal difference calculator 461 and a first decision part 462. For example, the minimal difference calculator 461 receives 5×5 window data of Bayer pattern, as shown in FIG. 7A or 7B (S10 of FIG. 6). The 5×5 window data is digital data of Bayer pattern as shown in FIG. 2. The minimal difference calculator 461 calculates a minimal difference MINDIFF for deciding whether each of current pixels R, G and B is good or bad while moving the current pixel at least one by one. FIG. 7A shows 5×5 window data surrounding the current pixel G and FIG. 7B shows 5×5 window data surrounding the current pixel R. 5×5 window data surrounding the current pixel B is received in the pattern shown in FIG. 7B.

Figure 6:
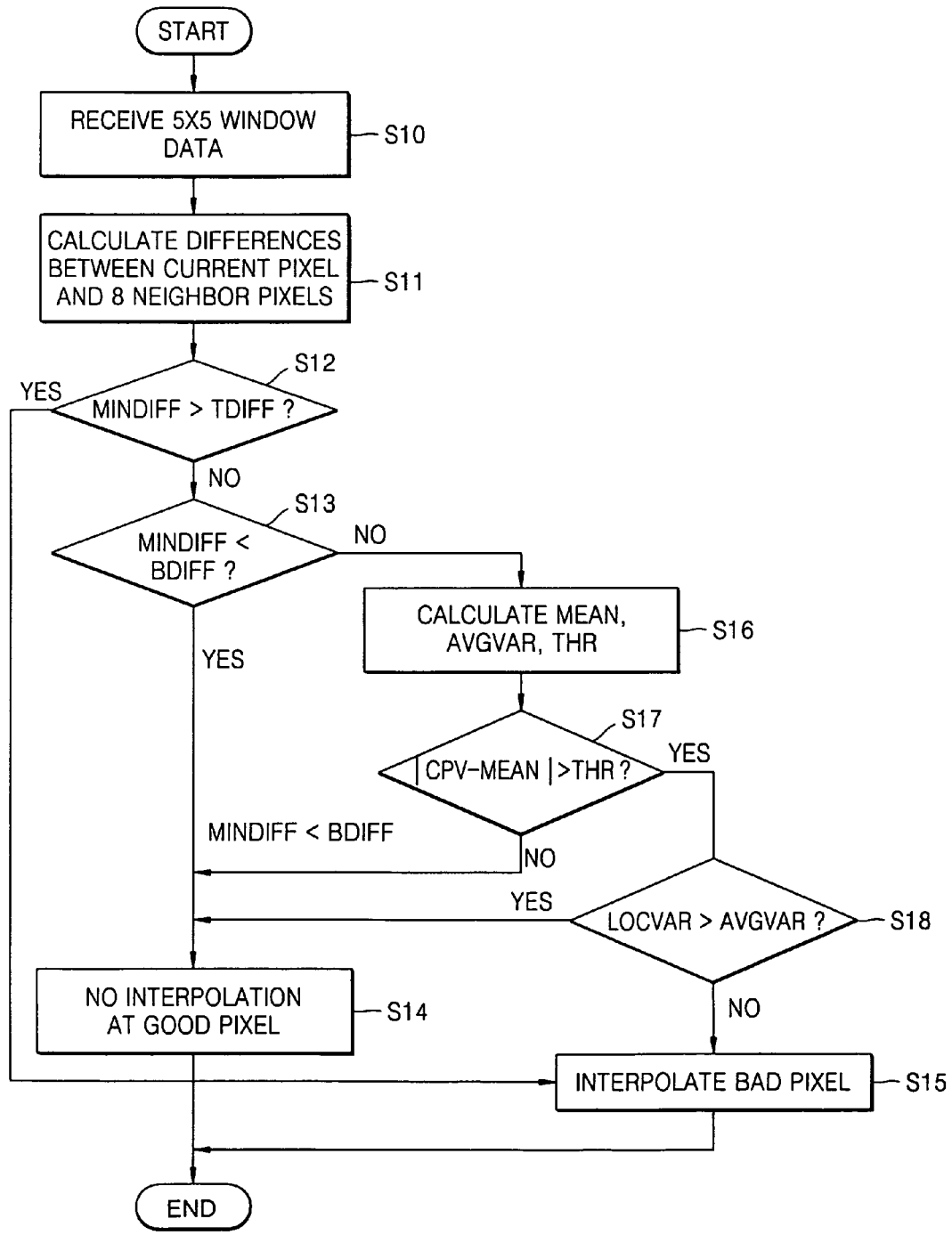
FIG. 6 is a flow chart showing the operation of the BP detector of FIG. 5.

When the 5×5 window data is received, the minimal difference calculator 461 calculates differences between the current pixel data and neighbor pixel data items from the input video data and obtains the minimal difference MINDIFF among the absolute values of the differences, as represented by Equation 1 (S11 of FIG. 6).

$$MINDIFF = \min\{ABS(RAW[i] - CPV)\} \quad \text{[Equation 1]}$$

where RAW[i] represents neighbor pixel data, CPV denotes the current pixel data value, and ABS( ) means an absolute value.

The neighbor pixel data corresponds to data of pixels having the same color as that of the current pixel, which are located closest to the current pixel in different directions. For example, neighbor pixels of the current pixel G in FIG. 7A include pixels P02, P11, P20, P31, P42, P33, P24 and P13 having the same color of the current pixel G. Neighbor pixels of the current pixel R in FIG. 7B include pixels P02, P00, P20, P40, P42, P44, P24 and P04 having the same color as that of the current pixel R. Neighbor pixels of the current pixel B are arranged similarly to those of the current pixel R.

The first decision part 462 compares the minimal difference MINDIFF calculated by the minimal difference calculator 461 with first and second thresholds TDIFF and BDIFF to generate the pixel information signal PIS representing whether the current pixel is good or bad. For example, when the minimal difference MINDIFF is larger than the first threshold TDIFF (S12 of FIG. 6), the current pixel is considered as a bad pixel and the first decision part 462 generates the pixel information signal PIS representing that the current pixel is bad. Data of the bad pixel is replaced by pixel data interpolated by the interpolator 420 (S15 of FIG. 6). When the minimal difference MINDIFF is not larger than the first threshold TDIFF (S12 of FIG. 6), the first decision part 462 determines whether the minimal difference MINDIFF is smaller than the second threshold BDIFF (S13 of FIG. 6). When the minimal difference MINDIFF is smaller than the second threshold BDIFF, the current pixel is considered as a good pixel and the first decision part 462 generates the pixel information signal PIS representing that the current pixel is good. Data of the good pixel does not need interpolation (S14 of FIG. 6).

When both the steps S12 and S13 are not satisfied, the minimal difference MINDIFF is between the first and second threshold TDIFF and BDIFF and the current pixel is suspected to be a bad pixel. Here, when the first decision part 462 generates the pixel information signal PIS corresponding thereto, the average variance checking unit 470 is operated.

Referring to FIG. 5, the average variance checking unit 470 includes an average variance calculator 471 and a second decision part 472. The average variance checking unit 470 determines whether the current pixel is bad or good when the minimal difference MINDIFF falls between the first and second thresholds TDIFF and BDIFF. The average variance calculator 471 calculates the mean of the differences between the current pixel data and the neighbor pixel data items, calculated by the minimal difference calculator 461, as represented by Equation 2, and calculates average variance in the neighborhood of the current pixel from the calculated mean, as represented by Equation 3. In Equations 2 and 3, n−1 means the number of the differences, which corresponds to 8 in the cases shown in FIGS. 7A and 7B.

$$MEAN=\{SUM(RAW[i]-CPV)\}/(n-1) \quad [\text{Equation 2}]$$

$$AVGVAR=\{SUM(ABS(RAW[i]-MEAN))\}/(n-1) \quad [\text{Equation 3}]$$

In addition, the average variance calculator 471 calculates a third threshold THR on which the average variance in the neighborhood of the current pixel is reflected (S16 of FIG. 6). The third threshold THR is used in the second decision part 472. The third threshold THR is represented by Equation 4. In Equation 4, MUL denotes a multiplier having a positive real number value.

$$THR=MUL*AVGVAR \quad [\text{Equation 4}]$$

Accordingly, the second decision part 472 judges whether the current pixel is good or bad based on the third threshold THR (S17 of FIG. 6). When the difference between the current pixel data and the mean MEAN is smaller than the third threshold THR, for example, the current pixel is considered as a good pixel and the second decision part 472 generates the pixel information signal PIS representing that the current pixel is a good pixel (S17 of FIG. 6). However, when the difference between the current pixel data and the mean MEAN is larger than the third threshold THR, the current pixel is suspected to be a bad pixel. In this case, the second decision part 472 generates the pixel information signal PIS representing that the current pixel is bad, and then the consistency checking unit 480 is operated.

Figure 8:
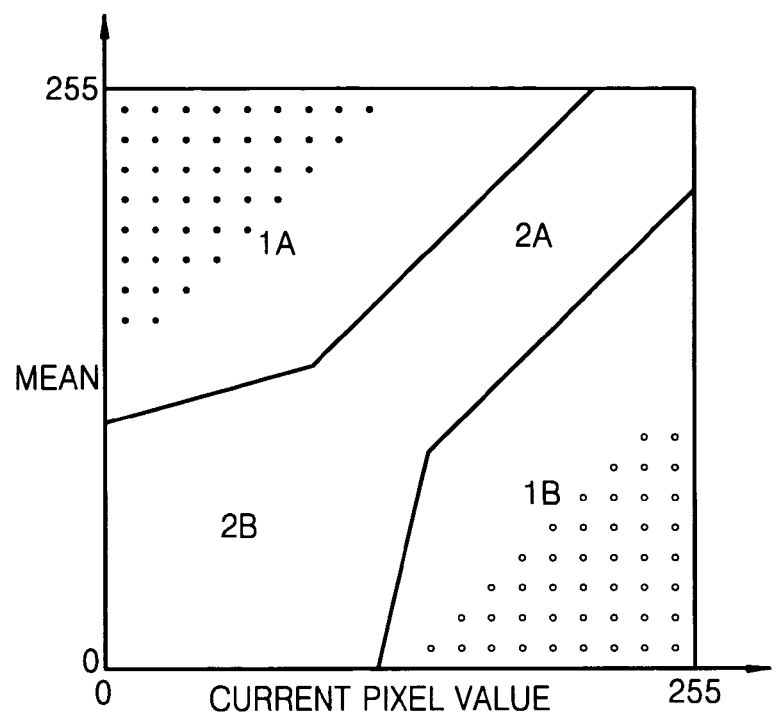
FIG. 8 is a graph showing an area noticed by the human eye and an area that is not noticed by the human eye in the relationship between the current pixel value and the mean.

In the mean time, white or black spots can be produced on a screen when images corresponding to bad pixels are displayed over multiple frames without being properly interpolated. However, not all the spots can be noticed by the human eye. For example, FIG. 8 shows areas 1A and 1B noticed by the human eye and areas 2A and 2B that are not noticed by the human eye in the relationship between the current pixel value and the mean value. In the area 1A, the gray level of the current pixel data is smaller than the mean of the gray levels in the neighborhood and bad pixels can produce black spots. In the area 1B, the gray level of the current pixel data is larger than the mean of the gray levels in the neighborhood and bad pixels can produce white spots. In the area 2A, all the current pixel data and neighbor pixel data have large gray levels and white and black spots caused by bad pixels are hardly noticed. In the area 2B, all the current pixel data and neighbor pixel data have small gray levels and white and black spots caused by bad pixels are hardly noticed. The ranges of the areas 1A and 1B where spots are noticed and the areas 2A and 2B where the spots are not noticed depend on which one of R, G and B pixels is the current pixel.

Based on this consideration, the second decision part 472 can adjust the multiplier MUL of Equation 4 when it judges whether the current pixel is good or bad based on the third threshold THR. In general cases, a satisfactory result can be obtained when the multiplier MUL is between about 2 through 4. In the areas 2A and 2B where spots are not noticed, however, a satisfactory result is expected even when the difference between the current pixel data and the mean is large. Accordingly, the second decision part 472 increases the multiplier MUL to make the third threshold THR become larger for the areas 2A and 2B where the mean value is similar to the gray level of the current pixel data. For the areas 1A and 1B, the second decision part 472 decreases the multiplier MUL to decrease the third threshold THR. For example, the second decision part 472 adjusts multiplier MUL to 2 to 2.5 for the areas 1A and 1B and controls it to 3.5 to 4 for the areas 2A and 2B.

As described above, the consistency checking unit 480 is operated when the average variance checking unit 470 suspects the current pixel to be a bad pixel. The consistency checking unit 480 is optional. The consistency checking unit 480 may be operated in order to reduce the number of good pixels wrongly tagged as bad pixels by the average variance calculator 471. The consistency checking unit 480 checks the neighbor pixels adjacent to the current pixel. The consistency checking unit 480 is operated on the supposition that the probability of two or more bad pixels adjacent to each other is very low and the probability of a high contrast edge or line of 1 pixel width is high.

Based on the supposition, the consistency checking unit 480 compares the average variance LOCVAR in at least one neighbor pixel with the average variance AVGVAR in the neighborhood of the current pixel to decide the pixel information signal PIS (S18 of FIG. 6). The average variance LOCVAR in the neighbor pixel is calculated by the average variance calculator 471, as represented by Equation 3. Here, the neighbor pixel includes pixels P11, P12, P13, P21, P23, P31, P32 and P33 shown in FIG. 7A and the average variance of at least one of these pixels is compared with the average variance of the neighborhood of the current pixel. When a plurality of average variances are compared, appropriate weights can be given to the compared values to be reflected on the decision of the pixel information signal PIS. When the average variance AVGVAR in the neighborhood of the current pixel is smaller than the average variance LOCVAR in the neighbor pixel, the current pixel is considered as a good pixel and the consistency checking unit 480 generates the pixel information signal PIS representing that the current pixel is good. If not, the current pixel is considered as a bad pixel and consistency checking unit 480 generates the pixel information signal PIS representing that the current pixel is bad.

Figure 9:
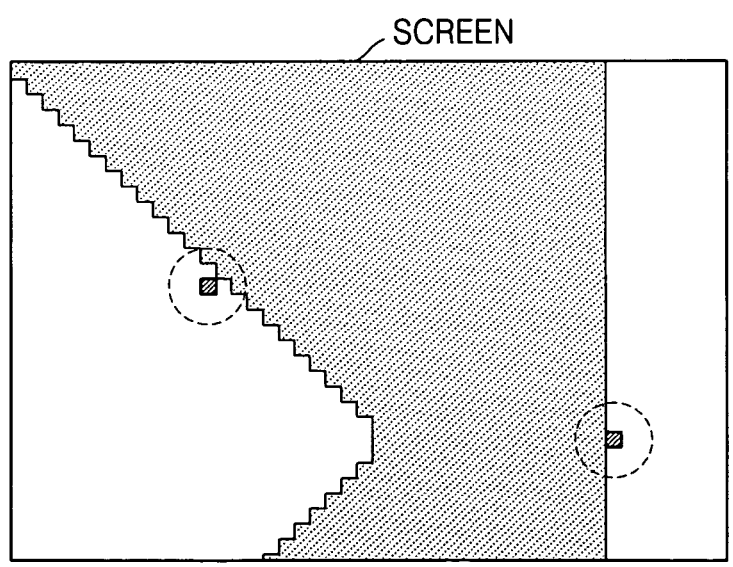
FIG. 9 illustrates the result caused by bad pixels that are not detected near the edge.

To discriminate good pixels from bad pixels near the image edge or a line, more accurate determination is required. When bad pixels near the edge/line are not properly detected, undesirable spots can occur on the screen, as shown in FIG. 9.

Figure 10:
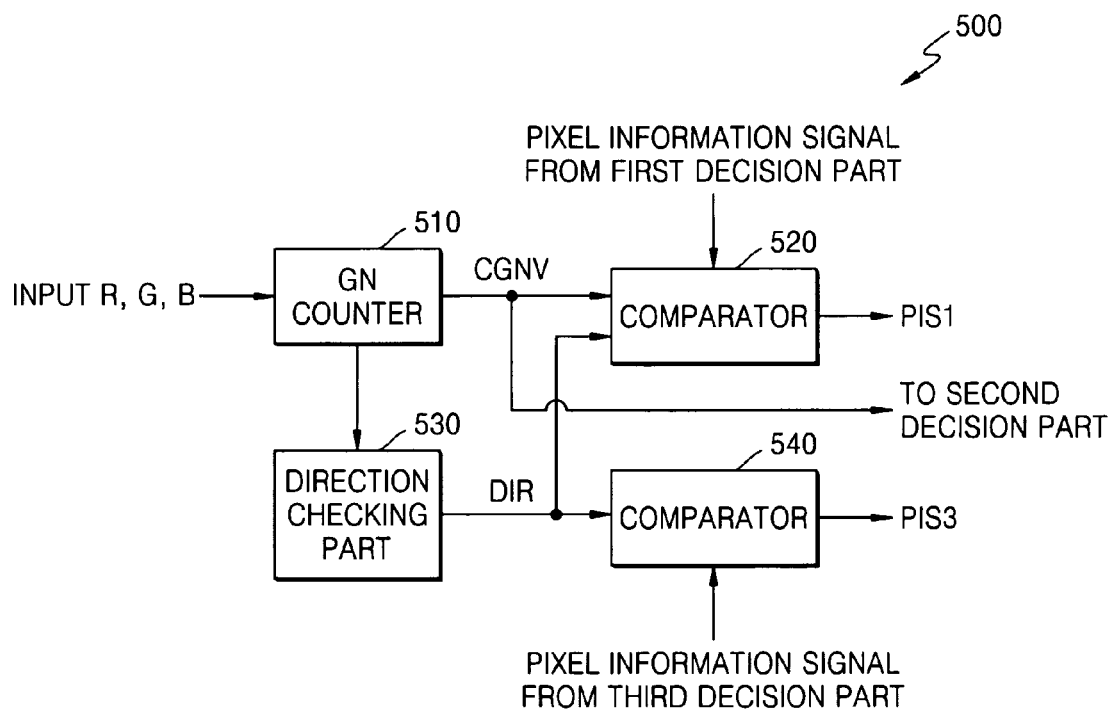
FIG. 10 is a block diagram of an edge/line checking unit that can be added to the BP detector of FIG. 5.

To discriminate good pixels from bad pixels near the edge/line with high accuracy, an edge/line checking unit 500 shown in FIG. 10 can be added as an option to the BP detector 410 of FIG. 5. Referring to FIG. 10, the edge/line checking unit 500 includes a Good Neighbor (GN) counter 510, a first comparator 520, a direction checking part 530 and a second comparator 540.

The GN counter 510 counts the number of good neighbor pixels based on the differences between the current pixel and 8 neighbor pixels adjacent to the current pixel. For example, when the absolute values of the differences between the current pixel and the neighbor pixels are smaller than a predetermined threshold, the neighbor pixels are considered as good neighbor pixels. The average variance checking unit 470 of FIG. 5 can control the third threshold THR in response to the count value CGNV. For example, the average variance checking unit 470 increases the multiplier MUL to increase the third threshold THR when the count value CGNV has a larger value.

When the threshold checking unit 460 generates the pixel information signal PIS representing that the current pixel is a bad pixel, the first comparator 520 determines a signal PIS1 that represents whether the current pixel is good and corresponds to a line or an edge in response to the count value CGNV and outputs the signal PIS1 as the pixel information signal of the threshold checking unit 460. For example, when the count value CGNV is larger than about 4, the first comparator 520 considers the current pixel as a good pixel and generates the signal PIS1 corresponding thereto. When the count value CGNV is 2, the current pixel corresponds to a line. But, for the current green (G) pixel, the count value CGNV 2 may also be a possible case of an edge.

When the count value CGNV is 3 and corresponding good neighbor pixels are adjacent to each other, the current pixel corresponds to an edge. In this case, the direction checking part 530 generates an edge direction value from the count value CGNV. When the current pixel corresponds to an edge, the first comparator 520 includes the edge direction value in the signal PIS1. When good neighbor pixels (+) are located at the left, left-top and top of the current pixel C as shown in FIG. 11A, for example, the current pixel C is considered as an edge because the three good neighbor pixels are adjacent. Here, the edge direction corresponds to the direction toward the good neighbor pixel N10 and the direction value at this time is decided as a specific value. However, when good neighbor pixels (+) are placed at the top, left-top and bottom of the current pixel C, as shown in FIG. 11C, the current pixel C is not considered as an edge but as a bad pixel because the three good neighbor pixels are not adjacent.

When the consistency checking unit 480 of FIG. 5 generates the pixel information signal representing that the current pixel is a bad pixel, the second comparator 540 determines a signal PIS3 representing whether the current pixel is good or bad in response to the edge direction value and outputs the signal PIS3 as the pixel information signal of the consistency checking unit 480. When the edge direction value of the current pixel is identical to the edge direction value of at least one neighbor pixel having a color different from the color of the current pixel, for example, the first comparator 520 considers the current pixel as a good pixel and generates the signal PIS3 corresponding thereto. When the edge direction value of a neighbor pixel N00 adjacent to the current pixel C is identical to the edge direction value of the current pixel C In FIG. 11B, for instance, the current pixel C is considered to be a good pixel.

Figure 12:
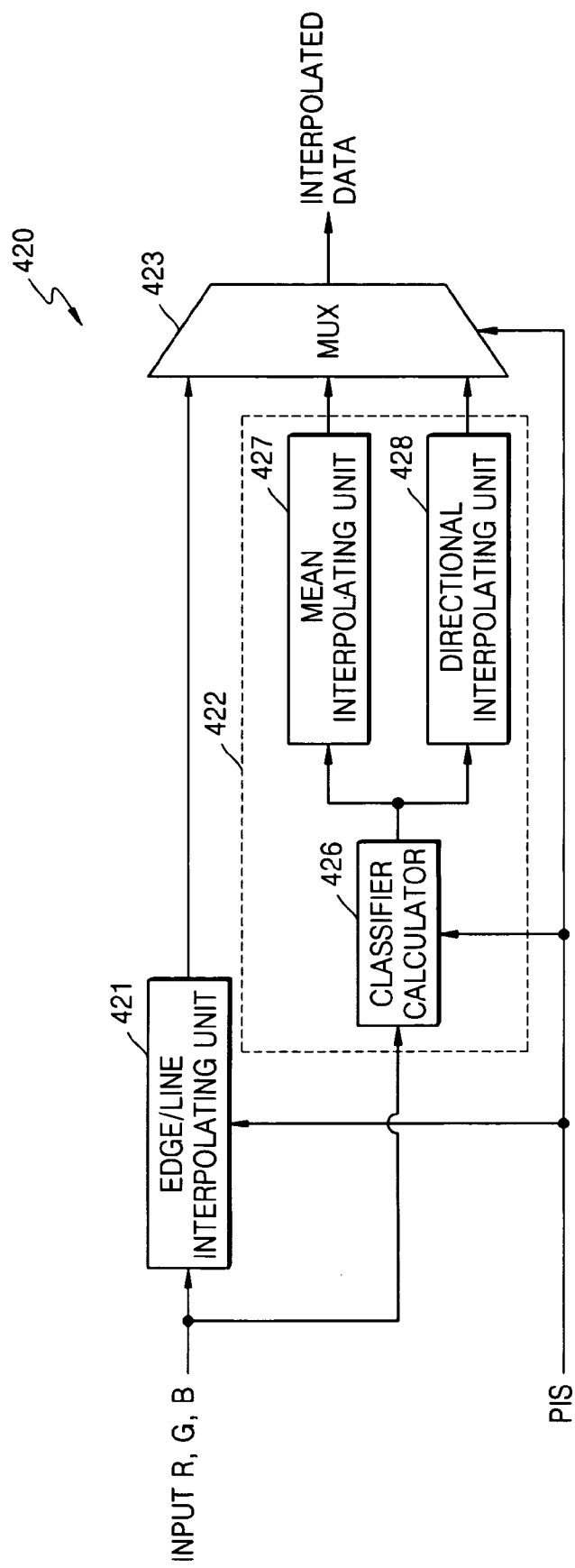
FIG. 12 is a block diagram of the interpolator of FIG. 4.

FIG. 12 is a block diagram of the interpolator 420 of FIG. 4. Referring to FIG. 12, the interpolator 420 includes an edge/line interpolating unit 421, a BP replacement unit 422, and a multiplexer 423. The edge/line interpolating unit 421 carries out interpolation based on the corresponding direction of the current pixel in response to the pixel information signal PIS when the current pixel corresponds to an edge or a line. Here, a general Bayer interpolation scheme can be used.

The BP replacement unit 422 includes a classifier calculator 426, a mean interpolator 427, and a directional interpolator 428. The BP replacement unit 422 interpolates the current pixel using neighbor pixel data when the pixel information signal PIS represents that the current pixel is a bad pixel and replaces the bad pixel with the interpolated data. For this, the classifier calculator 426 calculates a horizontal classifier representing a horizontal data gradient in the neighborhood of the current pixel and a vertical data gradient in the neighborhood of the current pixel. For the current pixel P22 in FIG. 7B, for example, the horizontal classifier is obtained by applying a predetermined weight to the values of pixels P20, P21, P22, P23 and P24 and the vertical classifier is calculated by applying a predetermined weight to the values of pixels P02, P12, P22, P32 and P42. Here, the current pixel P22 cannot be included in the calculation of the classifiers.

The means interpolating unit 427 performs median interpolation or mean interpolation when the absolute value of the difference between the classifiers calculated by the classifier calculator 426 is smaller than a predetermined threshold. For instance, the mean or median value of the values of the pixels P20, P21, P22, P23 and P24 used for calculating the horizontal classifier can be replaced by the value of the current pixel P22. Otherwise, the mean or median value of the values of the pixels P02, P12, P22, P32 and P42 used for calculating the vertical classifier can be replaced by the value of the current pixel P22. As well known in the art, the median value may correspond to the mean of elements other than maximum and minimum elements used for calculation.

The directional interpolating unit 428 performs directional interpolation in response to the levels of the classifiers. When the horizontal classifier is smaller than the vertical classifier, the current pixel value is replaced by a value obtained by applying a predetermined weight to the values of the pixels P20, P21, P22, P23 and P24 used for calculation of the horizontal classifier and summing up the values. When the vertical classifier is smaller than the horizontal classifier, the current pixel value is replaced by a value obtained by applying a predetermined weight to the values of the pixels P02, P12, P22, P32 and P42 used for calculation of the vertical classifier and summing up the values.

The multiplexer 423 selects one of the values interpolated by the edge/line interpolating unit, the mean interpolating unit 427 and the directional interpolating unit 428 in response to the pixel information signal PIS and outputs the selected value as a value replacing the bad pixel.

As described above, in the video signal processing apparatus 400 according to the present disclosure, the BP detector 410 generates the pixel information signal PIS representing whether the current pixel is good or bad from the input video data based on the difference between the current pixel data and neighbor pixel data. The interpolator 420 interpolates the bad pixel using neighbor pixel data in response to the pixel information signal PIS.

The video signal processing apparatus according to the present disclosure is applied to portable systems including digital still cameras and cellular telephones to minimize aliasing, color moiré, blurring, false/pseudo color effect, white or black spots and so on and improve visual quality through three-step BP detection from a Bayer pattern digital color video signal and signal interpolation based on the BP detection.

While the present invention has been particularly shown and described with reference to exemplary embodiments thereof, it will be understood by those of ordinary skill in the pertinent art that various changes in form and details may be made therein without departing from the spirit and scope of the present invention as defined by the following claims.

What is claimed is:

1. A video signal processing method implemented by a processor, the method comprising:
   receiving input video data;
   generating a pixel information signal that represents whether the current pixel is a good pixel or a bad pixel based on differences between the current pixel and neighbor pixels; and
   interpolating the bad pixel using neighbor pixel data in response to the pixel information signal;
   wherein generating the pixel information signal comprises:
   comparing the minimal value of the absolute values of the differences with first and second thresholds to decide the pixel information signal; and deciding the pixel information signal based on a third threshold on which average variance in the neighborhood of the current pixel is reflected when the minimal value is between the first and second thresholds;

wherein the method steps are performed by the processor.

2. The method of claim 1, wherein generating the pixel information signal further comprises comparing average variance in at least one neighbor pixel with average variance in the neighborhood of the current pixel to decide the pixel information signal.

3. The method of claim 1, wherein the third threshold is increased for a first area where the mean of the differences is similar to the gray level of the current pixel data but decreased for a second area where the mean of the differences is not similar to the gray level of the current pixel data.

4. The method of claim 3, wherein the first and second areas are defined depending on which one of pixels R, G and B is the current pixel.

5. The method of claim 1, wherein the neighbor pixel data corresponds to data of pixels having the same color as that of the current pixel, which are located closest to the current pixel in different directions in a Bayer pattern.

6. The method of claim 1, further comprising counting the number of good neighbor pixels based on the difference between the current pixel and neighbor pixels adjacent to the current pixel.

7. The method of claim 6, wherein the third threshold is adjusted in response to the count value.

8. The method of claim 6, further comprising:

generating an edge direction value from the count value; and when the pixel information signal, decided by comparing the minimal value of the absolute values of the differences between the current pixel and neighbor pixels with the first and second thresholds, represents that the current pixel is a bad pixel, deciding a signal that represents whether the current pixel is a good pixel and corresponds to a line or an edge in response to the count value and outputting the signal as the pixel information signal, wherein the edge direction value is included in the pixel information signal when the current pixel corresponds to an edge.

9. The method of claim 8, wherein the current pixel corresponds to a good pixel when the count value is larger than about 4, the current pixel corresponds to an edge and the edge direction value designating the direction from The current pixel to the middle good neighbor pixel among the good neighbor pixels when the count value is 3 and the corresponding good neighbor pixels are adjacent to each other, and the current pixel corresponds to a line when the count value is 2.

10. The method of claim 8, further comprising deciding a signal representing whether the current pixel is a good pixel or a bad pixel in response to the edge direction value and outputting the signal as the pixel information signal when the pixel information signal, which is decided by comparing average variance in at least one neighbor pixel with average variance in the neighborhood of the current pixel, represents that the current pixel is a bad pixel, wherein the current pixel corresponds to a good pixel when the edge direction value of the current pixel is identical to the edge direction value of at least one neighbor pixel having a color different from the color of the current pixel.

11. The method of claim 9, wherein when the pixel information signal represents that the current pixel corresponds to an edge or a line, interpolation based on the corresponding direction is performed.

12. The method of claim 1, wherein interpolating the bad pixel comprises:

calculating a horizontal classifier representing a horizontal data gradient in the neighborhood of the current pixel and a vertical classifier representing a vertical data gradient in the neighborhood of the current pixel when the pixel information signal represents that the current pixel is a bad pixel;

performing mean interpolation or median interpolation when the absolute value of the difference between the horizontal and vertical classifiers is smaller than a predetermined threshold; and carrying out directional interpolation in response to the levels of the horizontal and vertical classifiers when the absolute value of the difference between the horizontal and vertical classifiers is larger than the threshold.

13. A video signal processing apparatus comprising:

a BP detector generating a pixel information signal that represents whether the current pixel is a good pixel or a bad pixel from input video data based on differences between the current pixel and neighbor pixels; and an interpolator interpolating the bad pixel using neighbor pixel data in response to the pixel information signal;

wherein the BP detector comprises:

a threshold checking unit comparing the minimal value of the absolute values of the differences with first and second thresholds to decide the pixel information signal; and an average variance checking unit deciding the pixel information signal based on a third threshold on which average variance in the neighborhood of the current pixel is reflected when the minimal value is between the first and second thresholds.

14. The apparatus of claim 13, wherein the BP detector further comprises a consistency checking unit comparing average variance in at least one neighbor pixel with average variance in the neighborhood of the current pixel to decide the pixel. information signal.

15. The apparatus of claim 13, wherein the average variance checking unit increases the third threshold for a first area where the mean of the differences is similar to the gray level of the current pixel data but decreases the third threshold for a second area where the mean of the differences is not similar to the gray level of the current pixel data.

16. The apparatus of claim 15, wherein the first and second areas are defined depending on which one of pixels R, G and B is the current pixel.

17. The apparatus of claim 13, wherein the neighbor pixel data corresponds to data of pixels having the same color as that of the current pixel, which are located closest to the current pixel in different directions in a Bayer pattern.

18. The apparatus of claim 13, further comprising a counter counting the number of good neighbor pixels based on the difference between the current pixel and neighbor pixels adjacent to the current pixel.

19. The apparatus of claim 18, wherein the average variance checking unit adjusts the third threshold in response to the count value.

20. The apparatus of claim 18, further comprising:

a direction checking unit generating an edge direction value from the count value; and a first comparator deciding a signal that represents whether the current pixel is a good pixel and corresponds to a line or an edge in response to the count value and outputting the signal as the pixel information signal when the pixel information signal decided by the threshold checking unit represents that the current pixel is a bad pixel, wherein the edge direction value is included in the pixel information signal when the current pixel corresponds to an edge.

21. The apparatus of claim 20, wherein the current pixel corresponds to a good pixel when the count value is larger than about 4, the current pixel corresponds to an edge and the edge direction value designating the direction from the current pixel to the middle good neighbor pixel among the good neighbor pixels when the count value is 3 and the corresponding good neighbor pixels are adjacent to each other, and the current pixel corresponds to a line when the count value is 2.

22. The apparatus of claim 20, further comprising a second comparator deciding a signal representing whether the current pixel is a good pixel or a bad pixel in response to the edge direction value and outputting the signal as the pixel information signal when the pixel information signal, which is decided by comparing average variance in at least one neighbor pixel with average variance in the neighborhood of the current pixel, represents that the current pixel is a bad pixel, wherein the current pixel corresponds to a good pixel when the edge direction value of the current pixel is identical to the edge direction value of at least one neighbor pixel having a color different from the color of the current pixel.

23. The apparatus of claim 21, wherein, when the pixel information signal represents that the current pixel corresponds to an edge or a line, the interpolator performs interpolation based on the corresponding direction.

24. The apparatus of claim 13, wherein the interpolator calculates a horizontal classifier representing a horizontal data gradient in the neighborhood of the current pixel and a vertical classifier representing a vertical data gradient in the neighborhood of the current pixel when the pixel information signal represents that the current pixel is a bad pixel, performs mean interpolation or median interpolation when the absolute value of the difference between the horizontal and vertical classifiers is smaller than a predetermined threshold, and carries out directional interpolation in response to the levels of the horizontal and vertical classifiers when the absolute value of the difference between the horizontal and vertical classifiers is not smaller than the threshold.

* * * * *